United States Patent
Schimnowski et al.

(10) Patent No.: US 6,736,162 B2
(45) Date of Patent: May 18, 2004

(54) PRESSURE RELIEF VALVE WITH IMPROVED REPAIRABILITY

(75) Inventors: Kenneth Roger Schimnowski, Denison, TX (US); Jeffrey Lynn Cole, Allen, TX (US); Thomas Bethell Oliver, Greenville, TX (US)

(73) Assignee: Fisher Controls International, LLC, St. Louis, MO (US)

( * ) Notice: Subject to any disclaimer, the term of this patent is extended or adjusted under 35 U.S.C. 154(b) by 193 days.

(21) Appl. No.: 10/116,859

(22) Filed: Apr. 5, 2002

(65) Prior Publication Data

US 2003/0188784 A1 Oct. 9, 2003

(51) Int. Cl.[7] ................................................ F16K 17/04
(52) U.S. Cl. ........................ 137/541; 137/542; 251/361; 251/363
(58) Field of Search ................................. 137/541, 540, 137/535, 528, 542; 251/357, 360, 363, 361

(56) References Cited

U.S. PATENT DOCUMENTS

| | | |
|---|---|---|
| 1,774,690 A | 9/1930 | Willoughby |
| 2,522,145 A | 9/1950 | Thompson |
| 2,599,622 A | 6/1952 | Folmsbee |
| 2,608,210 A | 8/1952 | St. Clair |
| 2,614,582 A | 10/1952 | St. Clair |
| 2,834,374 A | 5/1958 | Klinkenberg |
| 2,854,021 A | 9/1958 | Baldwin, Jr. et al. |
| 3,008,485 A | 11/1961 | Johnson et al. |
| 4,674,530 A | 6/1987 | Bickford |
| 5,002,088 A | 3/1991 | Engelhardt et al. |
| 5,180,443 A | 1/1993 | Voss |
| 5,215,116 A | 6/1993 | Voss |
| 5,678,604 A | * 10/1997 | Plauborg et al. ......... 137/542 X |
| 6,581,633 B2 | * 6/2003 | Andersson ................... 137/541 |
| 2003/0221728 A1 | * 12/2003 | Enerson ...................... 137/541 |

FOREIGN PATENT DOCUMENTS

| | | |
|---|---|---|
| DE | 39 29 094 A1 | 4/1991 |
| EP | 1 096 188 A2 | 5/2001 |
| FR | 2 656 669 A | 7/1991 |
| GB | 2 217 815 A | 11/1989 |

OTHER PUBLICATIONS

International Search Report for PCT/US03/09376, issued Jul. 16, 2003.

* cited by examiner

*Primary Examiner*—Kevin Lee
(74) *Attorney, Agent, or Firm*—Marshall, Gerstein & Borun LLP

(57) ABSTRACT

A repairable pressure relief valve having a valve body that forms an internal fluted surface provides improved field repairability. The internal, fluted surface is adapted to mate with a removal tool. A valve assembly is slidably mounted in the valve housing and slides under excess pressure to vent vapor from a vessel, such as a tank. The valve body has a first seating surface for mating with a second seating surface on the valve assembly when the valve plug is in the closed position. The relief valve has a seal for sealing an interface between the valve plug and the housing and a removable cap mounted proximate to the valve plug for mechanically supporting the seal. The cap can be removed and the seal can be replaced without extensive disassembly of the valve, thereby eliminating the requirement of re-calibration after a repair has been made.

11 Claims, 2 Drawing Sheets

PRESSURE RELIEF VALVE WITH IMPROVED REPAIRABILITY

TECHNICAL FIELD

This invention relates generally to pressure relief valves and more particularly to a repairable pressure relief valve made for simplified installation and removal.

BACKGROUND

Pressure relief valves are typically used as safety devices to ensure that the pressure within a vessel, (i.e. tank, pipe, etc.) does not exceed a safe level. A typical pressure relief valve has a spring which applies a calibrated force to a valve plug. When the pressure in a vessel (and on the plug) applies a force that exceeds the spring force on the plug, the plug will lift from its seat and vent the excess pressure. When the force on the plug is reduced below the spring force, the valve plug is pulled back into its seat by the spring force and the vessel is resealed. Without a pressure relief valve, a tank or pipe could burst, causing serious problems.

The most common failure mode of a pressure relief valve is unwanted leakage around the sealing surface of the pressure relief valve. A few pressure relief valves utilize a metal to metal sealing surface; however, this type of seal requires precision machining and alignment to create an adequate seal. Conventional pressure relief valves utilize an elastomeric (rubber) seal does not require precision machining or alignment to adequately seal; however, elastomeric materials degrade over time and lose their sealing qualities. Maintaining a good seal on a pressure vessel is critical to the proper operation of a process. In process plants where minimal leakage is critical, relief valves are high maintenance items requiring frequent inspection, replacement or repair.

Conventional pressure relief valves are either un-repairable and disposable or require factory repair. If a repairable pressure relief valve requires significant disassembly, then re-calibration is required prior to the valve's re-entry into service. Many repairable pressure relief valves are sent to the factory for repair because field calibration is impractical. Although the replacement seal is often inexpensive, the labor, shipping, and loss of use, make factory repairable relief valves less than desirable.

Field repairable pressure relief valves are more economical, but the repair must be simple and the procedure cannot require complex tools and critical calibration. If the set point of a relief valve is unintentionally changed by a service person, system safety is compromised. More importantly, if it is possible for someone to alter a set point of a relief valve without realizing it and a disaster occurs because of the alteration, the manufacturer of the pressure relief valve could be exposed to liability.

Another important provision for repair of a pressure relief valve is ease of removal of the valve from a vessel. Most relief valves are threaded into the vessel. Often these vessels contain corrosive liquids and the threads on the relief valve bond to the threads of the vessel. As a result, the repairman must apply an extraordinary amount of force to the valve to "break it loose" from the corrosive bond to remove it from the vessel.

Typically, relief valves are flush mounted to vessels, such that the body of the valve is inside of the vessel. To remove a conventional flush mounted relief valve, a slot on the exposed face of the valve is provided for insertion of a bar (i.e. a giant flat blade screwdriver). A bar and slot configuration limits the amount of torque which can be placed on the relief valve during insertion and extraction. In fact, the slot provides only a small surface area for interfacing the bar.

Often, after a single removal of the relief valve the slot is disfigured and in subsequent installations the amount of torque that can be applied is greatly diminished. This is particularly important because the thread seal between the valve and the vessel is dependent on the amount of torque that can be placed on the valve. If a repairman cannot place enough rotational force on the relief valve, he will often resort to a hammer and chisel to pound on the slots to rotate the relief valve. Pounding on the relief valve can damage the threads of the vessel and also damage the relief valve.

SUMMARY

A repairable, pressure relief valve having a valve body that forms an internal fluted surface is provided. The internal fluted surface is adapted to mate with a removal tool made from common, hex bar-stock. A valve assembly is slidably mounted in the valve housing and slides under excess pressure to vent fluid or gas from a vessel, such as a tank. The valve body has a first seating surface for mating with a second seating surface on the valve assembly when the valve plug is in the closed position. The relief valve has a seal for sealing an interface between the valve plug and the body and a removable cap mounted proximate to the valve plug for mechanically supporting the seal. The cap can be removed and the seal can be replaced without extensive disassembly of the valve, thereby eliminating the requirement of re-calibration after a repair has been made.

DETAILED DESCRIPTION

Shortcomings of present pressure relief valves are addressed by a relief valve having improved reparability and more particularly field reparability, along with enhanced installation and removal means. The repairable pressure relief valve has a valve body that forms an inner fluted surface for insertion of a removal tool. The valve body has a first seating surface for interfacing with a second seating surface of a valve plug assembly. The repairable relief valve has a cap on the valve plug assembly that mechanically supports a seal. The cap can be removed to replace the seal without affecting the pressure setting or calibration of the pressure relief valve.

Figure 1:
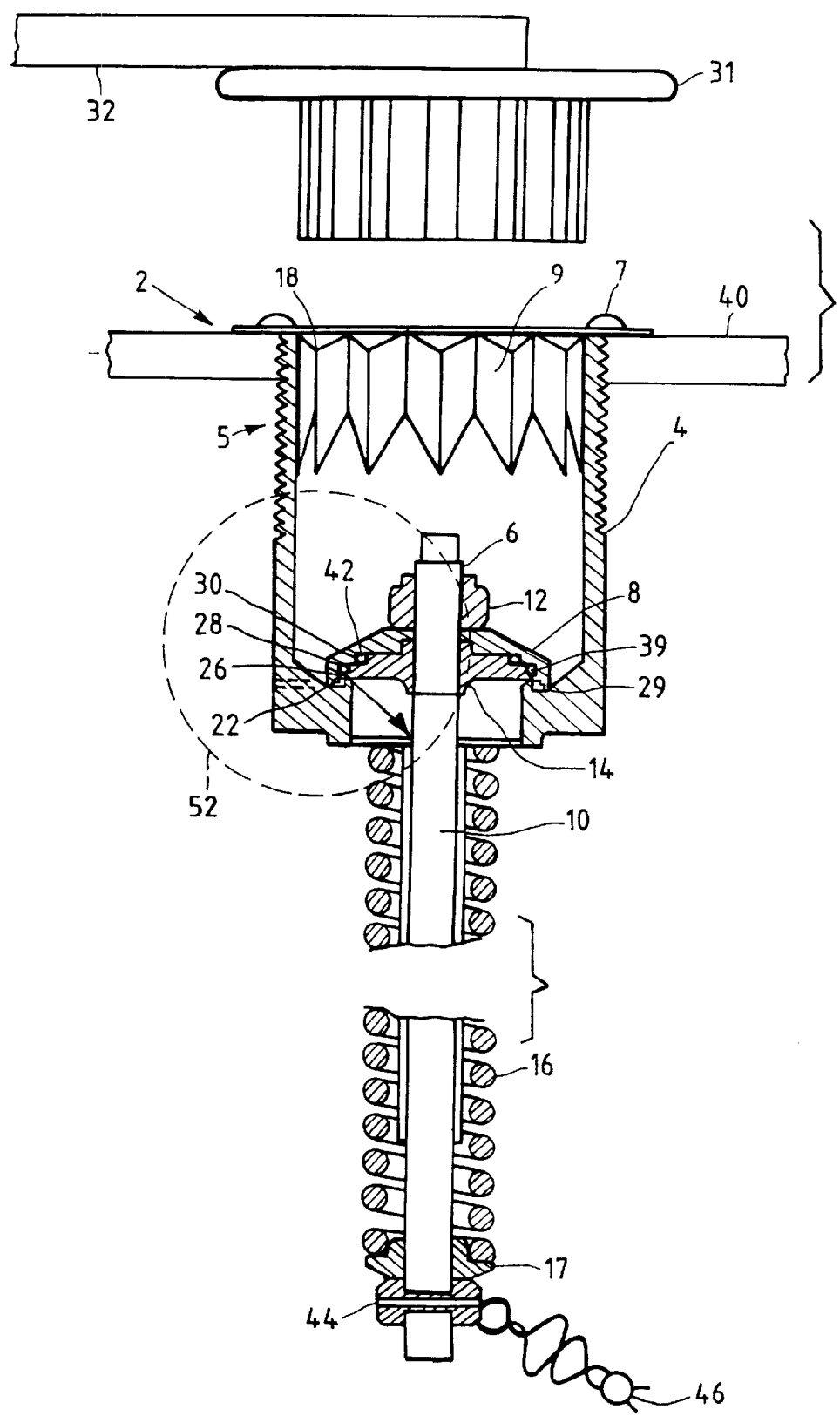
FIG. 1, illustrates a field repairable pressure relief valve.

The pressure relief valve 2 illustrated in FIG. 1 includes a valve body 4 forming a "socket" having a lip 7, an inner fluted surface 9 for engaging a removal tool 31 and an external threaded surface 5 for engaging a vessel 40 (partially shown). Flutes 18 on the inner fluted surface 9 generally are alternating protrusions and recessions on the inner fluted surface 9 formed perpendicular to the lip 7. The inner fluted surface 9 can be similar to a socket of a socket wrench or it can be any other shape having alternating protrusion and depressions such as a triangle, a square or a hexagon. Removal tool 31 has an external pattern which is generally, an inverse of the pattern found on the inner fluted surface 9 such that the removal tool can be easily inserted into valve body 4 for facilitating valve 2 installation or removal. A handle 32 coupled to tool 31 can provide for easy installation and removal.

The socket interface formed by the fluted surfaces 9 provides a substantial amount of surface area for the tool to apply a substantial amount of torque to the relief valve 2 during installation and removal without damaging the relief valve 2. The valve body 4 has a through hole 26 for mounting and guiding the sliding valve plug assembly 6. To allow vapor to escape through the body when the plug is lifted, the valve plug is suspended in the middle of the valve body by means of an integral yoke and guide bushing. The sliding valve plug assembly 6 includes a valve stem 10, a valve plug 14, a cap 8, a seal 28, a retainer 17, a tamper proof adjuster 44 and a spring 16. It is preferred to weld or pin (not shown) the valve plug 14 on the stem 10 so that it is stationary on the valve stem 10. If the valve plug 14 changes position on the valve stem 10 for any reason, the set point of the pressure relief valve 2 can change. The valve body 4 also has a first seating surface 22 that mates with a second seating surface 24 of the valve plug 14 when the sliding valve assembly 6 is in a closed position (seated position). The cap 8 is placed over the valve plug 14 and attached to the valve stem 10 to retain a seal 28 between the cap 8, the body 4 and the valve plug 14 (in the closed position as shown in FIG. 1) for sealing the contents of the vessel 40. A cap retaining nut 12 holds the cap 8 in place as shown.

A spring 16 is coupled to the valve stem 10 and the valve body 4 and used for biasing the valve plug 14 into a closed or seated position. A retainer 17 provides a bearing surface to support the spring 16 and the position of the retainer 17 on valve stem 10 dictates the compressive force between the first seating surface 22 and the second seating surface 24. The spring tension and the set point of the pressure relief valve 2 can be adjusted by changing the position of the retainer 17 on the valve stem 10 by adjusting the position of a tamper proof adjuster 44 on the valve stem 10. A locking mechanism 46 is affixed to a tamperproof adjuster 44, such that the tamperproof adjuster 44 cannot move in relationship to the valve stem 10 and change the tension of the spring 16 (and calibration of the setpoint) without a noticeable alteration, such as removal of the locking mechanism 46. In the illustrated embodiment, the tamperproof adjuster 44 is comprised of a nut having a through hole, a hole in the stem, and a hollow, steel pin. Locking mechanism 46 is a wire and lead seal, which is inserted through the hollow pin. The wire ends are passed through the lead seal, which is crimped to prevent movement of the wires. In order to move the tamperproof adjuster 44 on the valve stem 10, the locking mechanism 46 must be removed.

Figure 2:
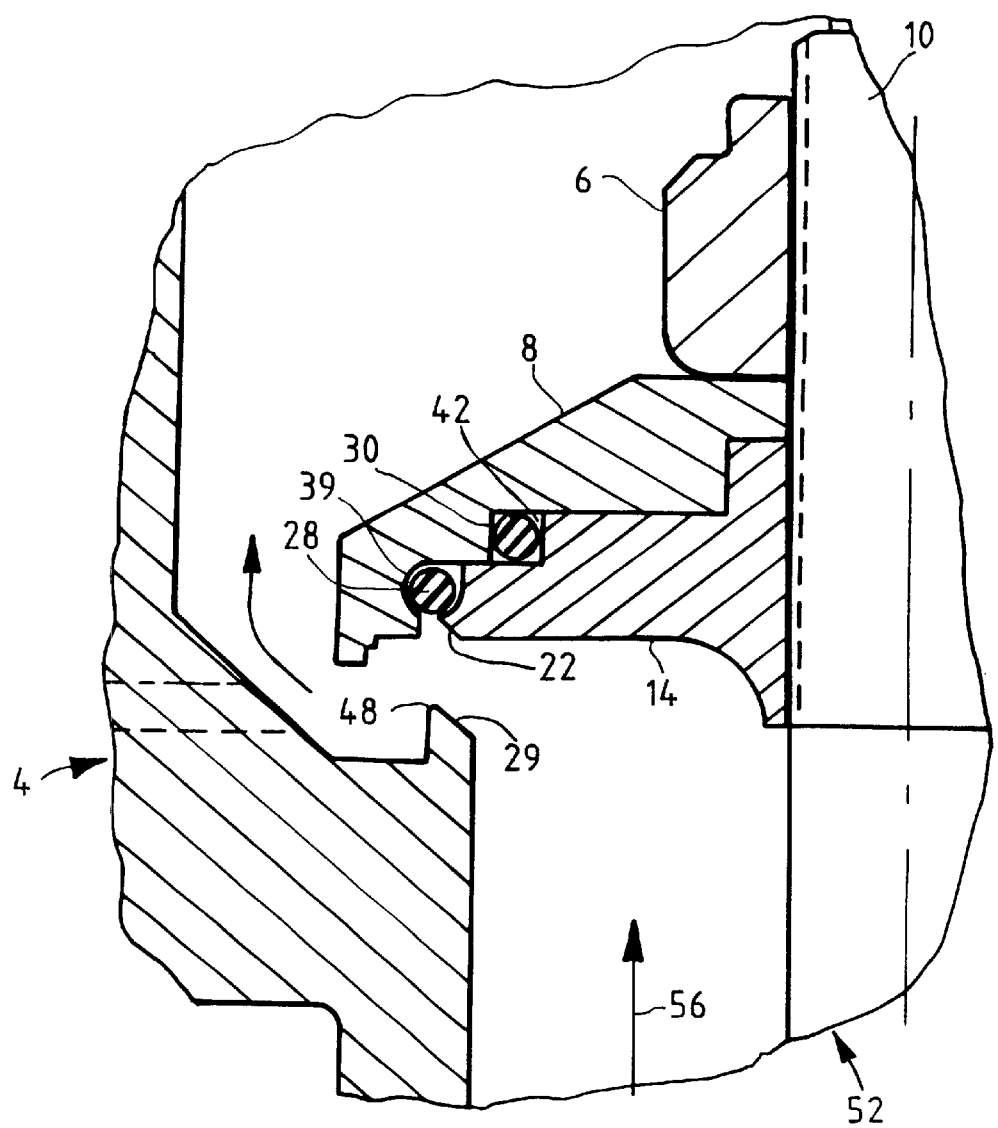
FIG. 2, depicts a more detailed view of an area between a valve plug and a valve seat of the field repairable pressure relief valve of FIG. 1.

The slidable valve plug assembly 6 slides or "pops up" to relieve excess pressure when the pressure inside of the vessel 40 applies a great enough force on the valve plug 14 to overcome the force of the spring 10 between the valve plug 14 and the body 4. FIG. 2 is an expanded view of encircled area 52 of FIG. 1, with plug 14 in an open position such that gas 56 can escape through the area between the body 4 and the plug 14. In FIGS. 1 and 2 like components have like designations. Sealing surface 29 on body 4, provides a pointed, machined surface for the seal 28 to create a leak-proof interface between the body 4 and the valve plug 14 (when the plug is seated). A first cavity 39 is formed between cap 8 and plug 14 to hold seal 28 adjacent to the sealing surface 29 when the valve plug 14 is in a closed position. When the plug 14 is in the closed position the sealing surface 29 protrudes into the first cavity 39 and contacts the seal 28. It is preferred that the tip of the protrusion has a smooth or blended edge 48 with a radius of twenty to thirty thousandths of an inch. Thus, the thickness of the protrusion near the apex would be between forty to sixty thousandths of an inch.

Due to the area on seal 28 where the sealing surface 29 engages the seal 28, wear typically occurs on the inside surface of the seal 28. When a leak develops on the inside surface of the seal 28, fluid can escape between the cap 8 and the plug 14 and exit the vessel around the nut 6. To seal off this "escape path", a second annular recess 42 is formed between the cap 8 and the plug 14 to retain a second seal 30.

It is preferred to manufacture the valve from a metal that resists corrosion such as stainless steel. Corrosion can create numerous problems that shorten the useful life of the valve and reduce the repairability of the valve 2. The foregoing has been a detailed description of preferred embodiments of this invention. Various modifications and additions can be made without departing from the spirit and scope of this invention. Accordingly, this description is meant to be taken only by way of example and not to otherwise limit the scope of the invention.

What is claimed is:

1. A repairable pressure relief valve comprising:
   a valve body having an internal fluted surface adapted to mate with a removal tool, a first seating surface and a first external threaded surface for mounting the repairable pressure relief valve to a pressure vessel;
   a valve plug assembly having a second seating surface for engagement with the first seating surface, the assembly slidably mounted in the valve housing and biased towards the first seating surface;
   a seal placed proximate to the first and second seating surfaces for providing a seal when the valve plug assembly is seated against the valve body; and
   a removable cap mounted proximate to the valve plug assembly for mechanically supporting the seal.

2. The pressure relief valve as in claim 1, wherein the valve plug assembly further includes a valve plug affixed to a valve stem and a spring coupled between the stem and the valve housing for creating a predetermined closing bias between the first sealing surface and the second seating surface.

3. The pressure relief valve as in claim 2, wherein the valve plug is stationary on the valve stem.

4. The pressure relief valve as in claim 1, wherein the valve body further includes a sealing surface on the valve body for engaging the seal when the valve assembly is in the closed position.

5. The pressure relief valve as in claim 4, wherein the sealing surface further includes a radius of between twenty to thirty thousandths of an inch.

6. The pressure relief valve as in claim 1, wherein the flutes on the inner fluted surface form a hexagonal socket.

7. The pressure relief valve as in claim 1, wherein a first cavity is formed between the valve plug and the cap to support the seal.

8. The pressure relief valve as in claim 1, further including a second seal for sealing a leak path between the cap and the plug.

9. The pressure relief valve as in claim 8, wherein a second cavity is formed between the valve plug and the cap to support the second seal.

10. The pressure relief valve as in claim 1 wherein the valve body is flush mountable to a vessel.

11. The pressure relief valve as in claim 1, wherein the housing is manufactured from stainless steel.

* * * * *

UNITED STATES PATENT AND TRADEMARK OFFICE
CERTIFICATE OF CORRECTION

PATENT NO. : 6,736,162 B2 Page 1 of 1
DATED : May 18, 2004
INVENTOR(S) : Keneth R. Schimnowski et al.

It is certified that error appears in the above-identified patent and that said Letters Patent is hereby corrected as shown below:

Title page,
Item [56], References Cited, U.S. PATENT DOCUMENTS, please delete "137/542 X" after "Plauborg et al." and insert -- 137/542 XR --.

Signed and Sealed this

Twenty-eighth Day of December, 2004

JON W. DUDAS
*Director of the United States Patent and Trademark Office*